Oct. 16, 1962  H. WEBER  3,058,805
PROCESS FOR THE PRODUCTION OF SODIUM ZEOLITE A
Filed Sept. 28, 1959
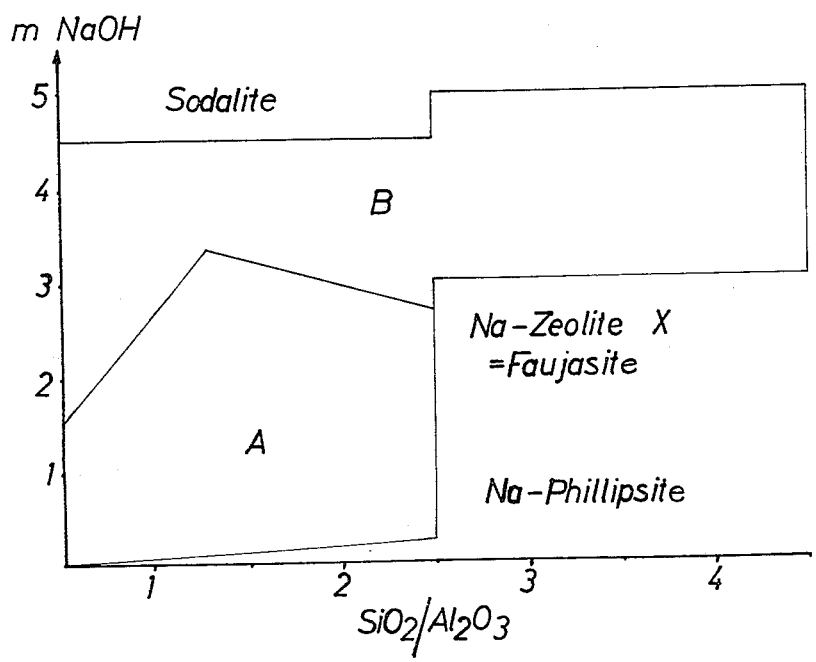
INVENTOR:
HORST WEBER
BY
Burgess, Dinklage & Sprung
ATTORNEYS

United States Patent Office
// 3,058,805
// Patented Oct. 16, 1962

3,058,805
PROCESS FOR THE PRODUCTION OF SODIUM ZEOLITE A
Horst Weber, Leverkusen, Germany, assignor to Farbenfabriken Bayer Aktiengesellschaft, Leverkusen, Germany, a corporation of Germany
Filed Sept. 28, 1959, Ser. No. 842,885
Claims priority, application Germany Oct. 3, 1958
3 Claims. (Cl. 23—113)

This invention relates to a process for the production of sodium zeolite A by hydrothermal synthesis from substances containing sodium oxide, silica and alumina. The process is characterised by the fact that, from the substances indicated, a mixture which has a molar ratio between $SiO_2$ and $Al_2O_3$ of about 0.5 to 4.5 is prepared and, after the formation of the sodium alumosilicate, contains free sodium hydroxide solution in a concentration between 1.5 and 5.0 mol/l. Depending on the $Si_2O/Al_2O_3$ ratio which is used, this concentration is within the limits.

(1.5–4.5) m NaOH with a $SiO_2/Al_2O_3$ ratio of 0.5,
(3.3–4.5) m NaOH with a $SiO_2/Al_2O_3$ ratio of 1.3,
(2.7–5.0) m NaOH with a $SiO_2/Al_2O_3$ ratio of 2.5,
(3.0–5.0) m NaOH with a $SiO_2/Al_2O_3$ ratio of 4.5.

The mixture is then heated for at least 15 minutes to the most about 80° C. These concentration limits are known diagrammatically in the drawing.

The invention further relates to the preparation of the mixture by combining a water glass solution with a sodium aluminate solution which has a molar ratio between $Na_2O$ and $Al_2O_3$ greater than 2.

It has long been known that zeolites, for example, analcite, sodalite, mordenite, K-chabazite and others, can be obtained from alkali oxide, silica and alumina by hydrothermal synthesis. Only recently, there has been described for the first time the existance and preparation of sodium zeolite A as another representative of this class of compounds. Sodium zeolite A has the composition $$(1.0 \pm 0.2)Na_2O.Al_2O_3.(1.85 \pm 0.2)SiO_2.(0.6)H_2O$$

belongs to the cubic crystal system ($\alpha$=12.3 A.; Z=6) and the crystal class $O_h^1$–$Pm3m$, shows the X-ray interferences indicated in Table 1 and is characterised by a pore size (see Table 1) of about 4 A. According to the data given in the literature, the pure crystalline compound is obtained by preparing aqueous mixtures containing sodium alumosilicate and free sodium hydroxide solution, these solutions having the molar ratios of $$\frac{SiO_2}{Al_2O_3}=0.5\text{-}1.3 \quad \frac{Na_2O}{SiO_2}=1.0\text{-}3.0 \quad \frac{H_2O}{Na_2O}=25\text{-}200$$

or $$\frac{SiO_2}{Al_2O_3}=1.2\text{-}2.5 \quad \frac{Na_2O}{SiO_2}=0.8\text{-}3.0 \quad \frac{H_2O}{Na_2O}=35\text{-}200$$

and heating these mixtures to 20 to 175° C. advantageously 100° C.

The preparation of a specific type of zeolite is now generally dependent, like the majority of the alumosilicates synthesised from $Na_2O$—$Al_2O_3$—$SiO_2$—$H_2O$ mixtures, not only on the temperature of crystallisation, but in addition particularly on the molar ratio between $SiO_2$ and $Al_2O_3$ of the sodium alumosilicate which is initially formed in the mixing and which is usually amorphous to X-rays, and on the concentration of the free sodium hydroxide solution present in the mixture after the formation of the sodium alumosilicate. The limits of the concentration range for the prior known process for the preparation of the sodium zeolite A in pure form are indicated in Table 2 and the accompanying drawing, these limits being characterised by the aforesaid values and being calculated from the molar ratios as indicated above.

The process according to the present invention is distinguished from the known processes, mainly by a larger range of the molar $SiO_2$—$Al_2O_3$ ratio and by higher concentrations of free sodium hydroxide solution. (See Table 2 and the drawing.) Outside the formation zones which are indicated, and also with crystallisation temperatures above 80° C., the zeolite A is in most cases only formed in admixture with the types of crystals comprising sodalite, faujasite (=Na-zeolite X), Na-phillipsite or amorphous products (see Table 3).

The higher concentrations of free sodium hydroxide solution offer the advantage that aluminate solutions with a high $Na_2O$ content (for example with a molar $Na_2O/Al_2O_3$ ratio of 2 to 4), can be used as second component in addition to water glass solutions for the preparation of the starting mixtures. These aluminate solutions are more stable than the solutions with a lower alkali content and, in contrast to the latter, do not precipitate any aluminium trihydrate, even after standing for several weeks.

The range of crystallisation of the present invention is so favourable for crystallisation of the sodium zeolite A that even at low temperatures of for example 40 to 60° C. it is only necessary to have heating times of from 2 to 5 hours. On the other hand, the starting mixture can be prepared at room temperature or even at higher temperatures up to about 80° C., by continuously or even by intermittently combining the starting substances. It is immaterial with the intermittent mixing whether the $SiO_2$ component or the $Al_2O_3$ component is initially supplied.

With the prior known processes, a sodium aluminate solution which had a low alkali content and was thus unstable was produced by dissolution of solid $NaAlO_2$ in sodium hydroxide solution (the $Na_2O/Al_2O_3$ ratio of said sodium aluminate solution being about 1.5). This solution and a corresponding water glass solution are separately conducted over heat exchangers and rapidly mixed at about 100° C. The mixture is then kept for 5 hours at 100° C. By comparison therewith, the novel working method of the present invention can be carried out more easily.

The invention is further illustrated by the following examples without being restricted thereto.

EXAMPLE 1

35 litres of a 2-molar $3.0Na_2O.Al_2O_3$ solution are diluted with 42.5 litres of water and heated to 60° C. 22.5 litres of a 1.65-molar $Na_2O.3.4SiO_2$ solution are uniformly added within 30 minutes to the first-mentioned solution while stirring slowly. The mixture (which has a composition of 0.7 m $Na_2O.Al_2O_3.1.8SiO_2$; 3.55 m NaOH), is heated for 5 hours to 60° C. while continuing the stirring. The resulting finely crystalline Na-zeolite A (crystallite size: 1–5$\mu$) is filtered off, washed and dried.

EXAMPLE 2

1360 ml. of 10-molar sodium hydroxide solution and 2780 ml. of water are added to 960 ml. of a 1.65-molar $Na_2O.3.4SiO_2$ solution. 900 ml. of a 2-molar $$3.0Na_2O\text{—}Al_2O$$

solution are added uniformly to the first-mentioned solution within 30 minutes while stirring slowly. The mixture, which has a composition of 0.3 m $Na_2O.Al_2O_3.3.0SiO_2$; 4.0 m NaOH is heated for 5 hours to 70° C. while continuing the stirring. The resulting finely crystalline Na-zeolite A is filtered off, washed and dried.

EXAMPLE 3

By means of controlled-feed capillaries from two storage containers, a 3.4 m NaOH solution of 0.2 m Na$_2$O.3.4SiO$_2$ and a 3.4 m NaOH solution of 0.2 m 3Na$_2$O.Al$_2$O$_3$ are each conducted at a rate of 20 litres per hour into a 1 litre overflow-type vessel. A high-speed grid stirrer is situated in the vessel which already contains 300 ml. of 4.0-molar sodium hydroxide solution. The mixture, which has a composition of 0.1 m $$Na_2O.Al_2O_3.3.4SiO_2$$

4.0 m NaOH, is collected in a 50 litre container and heated for 5 hours to 70° C. while stirring slowly. The resulting finely crystalline Na-zeolite A is filtered off, washed and dried.

*Table 1*

X-RAY INTERFERENCES OF THE Na-ZEOLITE A
(d-VALUES IN A.)

12.2±0.2
8.6±0.2
7.05±0.15
4.07±0.08
3.68±0.07
3.38±0.06
3.26±0.05
2.96±0.05
2.73±0.05

*Table 2*

COMPOSITION RANGES FOR THE PREPARATION OF THE Na-ZEOLITE A IN PURE FORM (a) According to the Prior Known Process

| Molar SiO$_2$/Al$_2$O$_3$ ratio | Alumosilicate concentration, mol/l. | Concentration of free NaOH, mol/l. |
|---|---|---|
| 0.5 | 0.18–4.4 | 0 –1.5 |
| 1.3 | 0.07–1.7 | 0.11–3.3 |
| 2.5 | 0.03–0.8 | 0.27–2.7 |

(b) According to the Process of the Invention:

| | | |
|---|---|---|
| 0.5 | 0.05–1.5 | 1.5 –4.5 |
| 1.3 | 0.05–1.2 | 3.3 –4.5 |
| 2.5 | 0.05–1.0 | 2.7 –5.0 |
| 4.5 | 0.05–0.3 | 3.0 –5.0 |

I claim:

1. In the process for the production of sodium zeolite A by hydrothermal synthesis of materials containing sodium oxide, silica and alumina, the improvement for forming sodium zeolite A in the pure state which comprises admixing sodium oxide, silica and alumina to form a mixture having a molar SiO$_2$/Al$_2$O$_3$ ratio of approximately 0.5 to 4.5 and which after the formation of the sodium alumosilicate contains free sodium hydroxide solution in a concentration of between 1.5 and 5.0 mol per liter depending on the SiO$_2$/Al$_2$O$_3$ ratio involved coming within the area B of the figure and falling within the limits.

(1.5–4.5) m NaOH with an SiO$_2$/Al$_2$O$_3$ ratio of 0.5
   (3.3–4.5) m NaOH with an SiO$_2$/Al$_2$O$_3$ ratio of 1.3
   (2.7–5.0) m NaOH with an SiO$_2$/Al$_2$O$_3$ ratio of 2.5
   (3.0–5.0) m NaOH with an SiO$_2$/Al$_2$O$_3$ ratio of 4.5 heating said mixture for at least 15 minutes to a temperature not exceeding about 80° C., and recovering the pure zeolite formed.

2. Improvement according to claim 1, which comprises effecting said heating at a temperature of between about 60 and 70° C.

3. Improvement according to claim 1 in which said mixture is formed by admixing a water-glass solution with a sodium aluminate solution having a molar NaO$_2$/Al$_2$O$_3$ ratio greater than 2.0.

References Cited in the file of this patent
UNITED STATES PATENTS
2,882,243    Milton _____ Apr. 14, 1959
OTHER REFERENCES
Barrer et al.: J. Chem. Soc., 1561–71 (1952).

*Table 3*

EXAMPLES OF THE MANUFACTURE OF Na-ZEOLITE A

| Composition of the starting mixture | Crystallisation Temp. | Time, hours | Secondary constituents |
|---|---|---|---|
| 0.75 m Na$_2$O.Al$_2$O$_3$.1.2SiO$_2$; 3.5 m NaOH | 50 | 5 | None. |
| Do | 75 | 5 | Do. |
| Do | 100 | 5 | 25% Sodalite. |
| 0.5 m Na$_2$O.Al$_2$O$_3$.1.5SiO$_2$; 2.3 m NaOH | 75 | 5 | None. |
| Do | 100 | 5 | 5% Sodalite. |
| 0.75 m Na$_2$O.Al$_2$O$_3$.1.5SiO$_2$; 3.1 m NaOH | 50 | 5 | None |
| Do | 75 | 5 | Do. |
| Do | 100 | 5 | 25% Sodalite. |
| 0.75 m Na$_2$O.Al$_2$O$_3$.1.8SiO$_2$; 3.3 m NaOH | 50 | 5 | None. |
| Do | 65 | 5 | Do. |
| Do | 100 | 5 | 20% Sodalite. |
| 1.0 m Na$_2$O.Al$_2$O$_3$.1.8SiO$_2$; 4.3 m NaOH | 50 | 5 | None. |
| Do | 100 | 5 | 50% Sodalite. |
| 0.75 m Na$_2$O.Al$_2$O$_3$.2.0SiO$_2$; 3.3 m NaOH | 50 | 5 | None. |
| Do | 75 | 5 | Do. |
| Do | 100 | 5 | 25% Sodalite. |
| 0.5 m Na$_2$O.Al$_2$O$_3$.2.0SiO$_2$; 3.0 m NaOH | 110 | 2 | None. |
| 0.4 m Na$_2$O.Al$_2$O$_3$.2.1SiO$_2$; 2.7 m NaOH | 50 | 19 | Do. |
| Do | 70 | 19 | Do. |
| 0.3 m Na$_2$O.Al$_2$O$_3$.2.3SiO$_2$; 2.5 m NaOH | 70 | 5 | Do. |
| Do | 100 | 5 | 10% Na-Phillipsite. |
| 0.4 m Na$_2$O.Al$_2$O$_3$.2.3SiO$_2$; 2.9 m NaOH | 50 | 17 | Do. |
| Do | 70 | 19 | Do. |
| 0.4 m Na$_2$O.Al$_2$O$_3$.2.5SiO$_2$; 3.2 m NaOH | 75 | 17 | Do. |
| 0.1 m Na$_2$O.Al$_2$O$_3$.2.8SiO$_2$; 2.8 m NaOH | 70 | 5 | Do. |
| 0.3 m Na$_2$O.Al$_2$O$_3$.3.0SiO$_2$; 4.0 m NaOH | 70 | 5 | Do. |
| Do | 100 | 5 | 80% Sodalite plus 5% Na-Zeolite X. |
| 0.3 m Na$_2$O.Al$_2$O$_3$.3.4SiO$_2$; 5.0 m NaOH | 70 | 5 | None. |
| 0.1 m Na$_2$O.Al$_2$O$_3$.3.5SiO$_2$; 4.0 m NaOH | 70 | 3 | Do. |
| Do | 100 | 3 | 50% Sodalite. |
| 0.1 m Na$_2$O.Al$_2$O$_3$.5.0SiO$_2$; 3.5 m NaOH | 75 | 19 | 50% Na-Zeolite X. |
| 0.1 m Na$_2$O.Al$_2$O$_3$.10.0SiO$_2$; 4.0 m NaOH | 100 | 3 | 25% Sodalite. |